United States Patent
Huang et al.

(10) Patent No.: US 10,705,743 B2
(45) Date of Patent: Jul. 7, 2020

(54) MEMORY CONTROL DEVICE, CONTROL METHOD OF FLASH MEMORY, AND METHOD FOR GENERATING SECURITY FEATURE OF FLASH MEMORY

(71) Applicant: RAYMX Microelectronics Corp., Hefei (CN)

(72) Inventors: Shih-Fu Huang, Hefei (CN); Cheng-Yu Chen, Hefei (CN); Yi-Lin Hsieh, Hefei (CN); Jing-Long Xiao, Hefei (CN)

(73) Assignee: RAYMX MICROELECTRONICS CORP., Hefei, Anhui Province (CN)

( * ) Notice: Subject to any disclaimer, the term of this patent is extended or adjusted under 35 U.S.C. 154(b) by 0 days.

(21) Appl. No.: 16/354,280

(22) Filed: Mar. 15, 2019

(65) Prior Publication Data

US 2020/0081635 A1   Mar. 12, 2020

(30) Foreign Application Priority Data

Sep. 7, 2018 (TW) .............................. 107131621 A

(51) Int. Cl.
*G11C 16/14* (2006.01)
*G06F 3/06* (2006.01)
*G11C 16/10* (2006.01)
*G11C 16/26* (2006.01)
*G11C 16/22* (2006.01)
*G11C 16/04* (2006.01)

(52) U.S. Cl.
CPC .......... *G06F 3/0622* (2013.01); *G06F 3/0652* (2013.01); *G06F 3/0659* (2013.01); *G06F 3/0679* (2013.01); *G11C 16/10* (2013.01); *G11C 16/14* (2013.01); *G11C 16/225* (2013.01); *G11C 16/26* (2013.01); *G11C 16/0483* (2013.01)

(58) Field of Classification Search
CPC .................................. G06F 3/06; G11C 16/14
USPC ......................................................... 711/103
See application file for complete search history.

(56) References Cited

U.S. PATENT DOCUMENTS

| 9,633,738 B1* | 4/2017 | Guo ........................ G11C 16/10 |
| 2013/0132793 A1* | 5/2013 | Ha ..................... H03M 13/2912 714/755 |
| 2014/0047146 A1* | 2/2014 | Nakagawa .............. G06F 13/42 710/105 |
| 2015/0355845 A1* | 12/2015 | Lee ........................ G06F 3/0679 711/103 |

(Continued)

OTHER PUBLICATIONS

TW Office Action dated Aug. 16, 2019 in Taiwan application (No. 107131621).

*Primary Examiner* — Christopher B Shin
(74) *Attorney, Agent, or Firm* — McClure, Qualey & Rodack, LLP

(57) ABSTRACT

A method for generating a security feature of a flash memory includes determining a memory block from a plurality of memory blocks in the flash memory; erasing data of the determined memory block of the flash memory; providing a predetermined voltage to the determined memory block to obtain a plurality of corresponding threshold voltages of a plurality of cells in the determined memory block, wherein each of the corresponding threshold voltages corresponds to a characteristic of each cell in the determined memory block; and establishing a security feature based on the plurality of corresponding threshold voltages.

12 Claims, 3 Drawing Sheets

(56) References Cited

U.S. PATENT DOCUMENTS

| | | | |
|---|---|---|---|
| 2016/0093393 A1* | 3/2016 | Park | G11C 16/26 |
| | | | 380/28 |
| 2016/0093397 A1* | 3/2016 | Tabrizi | G11C 16/3495 |
| | | | 711/103 |
| 2016/0323096 A1* | 11/2016 | Kara-Ivanov | H04L 9/002 |
| 2018/0040356 A1 | 2/2018 | Hung et al. | |
| 2018/0176012 A1* | 6/2018 | Hung | G09C 1/00 |
| 2019/0244673 A1* | 8/2019 | Yang | G11C 16/3427 |
| 2019/0287618 A1* | 9/2019 | Kimura | G11C 7/04 |

* cited by examiner

MEMORY CONTROL DEVICE, CONTROL METHOD OF FLASH MEMORY, AND METHOD FOR GENERATING SECURITY FEATURE OF FLASH MEMORY

CROSS-REFERENCE TO RELATED APPLICATION

This non-provisional application claims priority under 35 U.S.C. § 119(a) to Patent Application No. 107131621 in Taiwan, R.O.C. on Sep. 7, 2018, the entire contents of which are hereby incorporated by reference.

BACKGROUND

Technical Field

The present invention relates to a data storage device, and in particular, to an access method of a flash memory.

Related Art

A flash memory is a common storage device in an electronic device in recent years. The flash memory is a non-volatile memory. Using a NAND gate flash memory (NAND Flash) as an example, the flash memory is usually applied to a storage device such as a memory card, a universal serial bus flash device (USB Flash Device), or a solid state disk (SSD). A storage array provided by the flash memory is formed by a plurality of blocks, and each block includes a plurality of pages. When the flash memory copies or erases data, all pages in an entire block are used as a unit.

How to prevent important data (such as a key code of a digital wallet) from being stolen is a major consideration in the design of storage devices. However, when copying is not allowed, after a storage device is disassembled, important data in the flash memory can still be copied to another storage device by using third-party software (Software Tool) and a third-party memory controller (Flash Controller).

SUMMARY

In an embodiment, a method for generating a security feature of a flash memory is provided. The method includes: determining a memory block from a plurality of memory blocks in the flash memory; erasing data of the determined memory block of the flash memory; providing a predetermined voltage to the determined memory block to obtain a plurality of corresponding threshold voltages of a plurality of cells in the determined memory block, wherein each of the corresponding threshold voltages corresponds to a characteristic of each cell in the determined memory block; and establishing a security feature based on the plurality of corresponding threshold voltages.

In an embodiment, a memory control device is disclosed. The memory control device includes a storage unit, for storing a pre-stored security feature, wherein the pre-stored security feature is produced according to a plurality of corresponding threshold voltages of a plurality of cells of a memory block in the flash memory, wherein each of the corresponding threshold voltages corresponds to a characteristic of each cell in the memory block; and a data read-write circuit, coupled to the storage unit, configured to receive a data access request form a host, and to establish a security feature based on the plurality of cells in the memory block, to compare the established security feature with the pre-stored security feature to generate a comparison result, and to determine whether to allow the data access request according to the comparison result.

In an embodiment, a control method of a flash memory is disclosed. The control method comprises: receiving a data access request form a host; retrieving a pre-stored security feature from a storage unit, wherein the pre-stored security feature is produced according to a plurality of corresponding threshold voltages of a plurality of cells of a memory block in the flash memory, wherein each of the corresponding threshold voltages corresponds to a characteristic of each cell in the memory block; performing a security confirmation program for the data access request, wherein the security confirmation program comprises: establishing a security feature based on the plurality of cells in the memory block; and comparing the established security feature with the pre-stored security feature to generate a comparison result; and determining whether to allow the data access request according to the comparison result.

In conclusion, according to the memory control device, the control method of a flash memory, and the method for generating a security feature of the present invention, an exclusive security feature is generated by using characteristics of the flash memory and is used as a data protection key, to ensure the data security.

BRIEF DESCRIPTION OF THE DRAWINGS

The present invention will become more fully understood from the detailed description given herein below for illustration only, and thus are not limitative of the present invention, and wherein.

DETAILED DESCRIPTION

The "couple" or "connect" used in this specification may mean that two or more components are mutually directly used as entities or in electrical contact, or are mutually indirectly used as entities or in electrical contact. The "couple" or "connect" may also mean that two or more components mutually operate or act.

Figure 1:
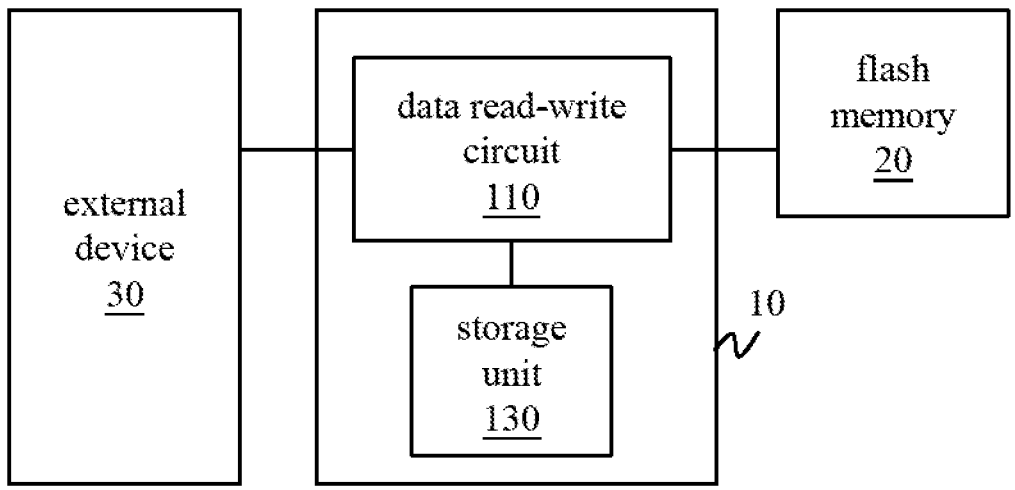
FIG. 1 is a functional block diagram of a memory control device in an application status according to an embodiment of the present invention.

Referring to FIG. 1, in an embodiment, a memory control device 10 is applicable to an access operation for controlling a flash memory 20. In this case, the flash memory 20 includes a plurality of memory blocks.

The memory control device 10 includes a data read-write circuit 110 and a storage unit 130. The data read-write circuit 110 is coupled to the storage unit 130.

The data read-write circuit 110 is externally coupled to the flash memory 20. The data read-write circuit 110 is configured to read a data sequence stored in the flash memory 20 and provide the read data sequence to an external device 30, or store an external data sequence to the flash memory 20.

In some embodiments, the data read-write circuit 110 is further configured to generate a security feature relative to characteristic of the flash memory 20.

Figure 2:
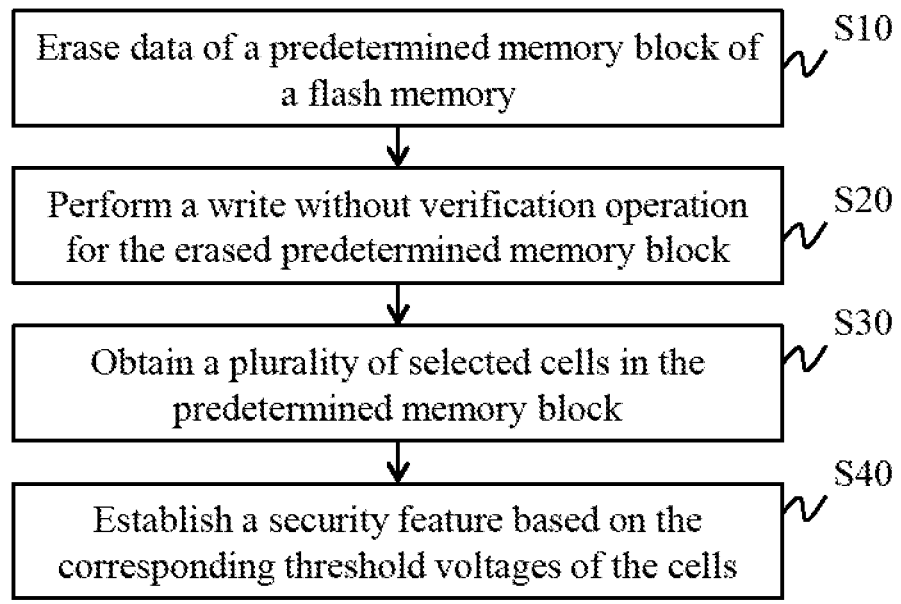
FIG. 2 is a flowchart of a method for generating a security feature of a flash memory according to an embodiment of the present invention.
Figure 3:
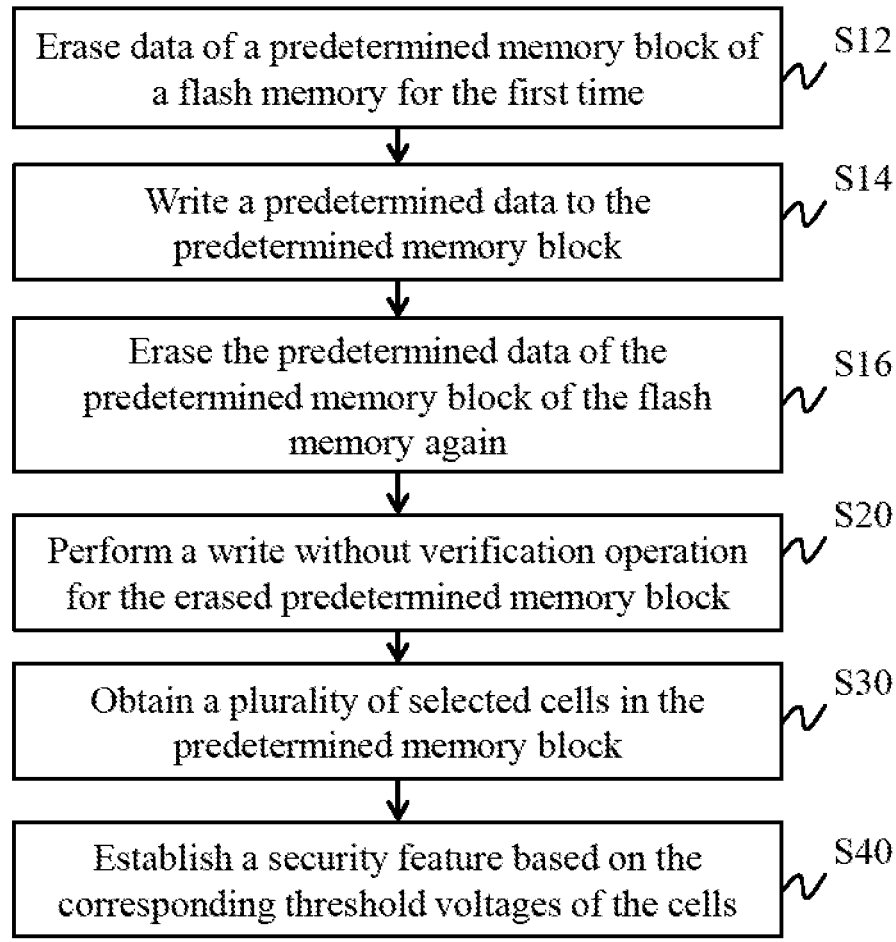
FIG. 3 is a flowchart of a method for generating a security feature of a flash memory according to another embodiment of the present invention.

Referring to FIG. 1 and FIG. 2, in an embodiment, the data read-write circuit 110 erases data in one memory block (referred to as a "predetermined memory block" in the following for description) of the plurality of memory blocks of the flash memory 20 (step S10 (step of Block Erase)). The predetermined memory block has been confirmed to be capable of operating normally, and has an excellent characteristic. In other words, the predetermined memory block is not any one of memory blocks in storage device, but is determined to be excellent in characteristics and can be normally operated, that is, the memory control device 10 has a list of information of a good memory block and a bad memory block. And according to the list, the bad memory block is excluded and at least one good memory block is selected from the good memory block to be the predetermined memory block. In some embodiments, the predetermined memory block may be any one of all good memory blocks of the flash memory 20. For example, the predetermined memory block may be a memory block 0 (Block 0), a memory block 1, a memory block 2, or another memory block. In an embodiment of step S10, the data read-write circuit 110 may perform a block erase operation for the predetermined memory block only once. In another embodiment of step S10, referring to FIG. 1 and FIG. 3, the data read-write circuit 110 may perform at least two block erase operations for the predetermined memory block, to prevent the characteristics of the predetermined memory block from generating an error due to an unknown manual operation. By using a twice-erasing operation as an example, the data read-write circuit 110 erases data in the predetermined memory block for the first time (step S12), and then writes a predetermined data to the predetermined memory block (step S14). In step S14, the data read-write circuit 110 performs a block write operation of the predetermined memory block according to the predetermined data by using a normal write voltage. After the writing (step S14), the data read-write circuit 110 erases the predetermined data in the written predetermined memory block again (step S16). In an embodiment of step 14, the value of the predetermined data is "all 0", "all 1" or a random value generated by a random generator.

After the erasing (step S10), the data read-write circuit 110 performs a write without verification operation for the erased predetermined memory block (step S20). In other words, the data read-write circuit 110 performs a write without verification operation for each cell in the predetermined memory block by using a predetermined voltage lower than the highest normal write voltage of the storage device, so that each cell in the predetermined memory block has a different corresponding potential (Vt, also referred to as a threshold voltage) due to characteristic of each cell is different.

Since the normal write voltage of the flash memory is in a range (e.g., 14~22 volts), in step S14, the predetermined write voltage lower than the highest normal write voltage (22 volts) of the flash memory is selected to perform a write without verification operation on the predetermined memory block. This avoids excessively large predetermined voltages (e.g., 24 volts) that can damage the flash memory.

In another embodiment of this step S14, the data read-write circuit 110 performs a Dumb Program on the predetermined memory block by using a fixed voltage. The Dumb Program is different from the data write operation generally used for storing data. In the data write operation, the data read-write circuit 110 provides a write voltage and input data to the memory cells, and the memory cells store the input data, and the stored data in the memory cells are verified; In the Dumb Program, the data read-write circuit 110 does not provide any write data, and only provides a fixed voltage to the memory cells, and each memory cell has a corresponding threshold voltage (Vt). That is, the threshold voltage Vt of each memory cell is corresponding to a characteristic of each memory cell. The fixed voltage is lower than the highest normal write voltage.

After the writing (step S20), the data read-write circuit 110 selects a plurality of cells in the written predetermined memory block (step S30) and establishes a security feature based on the selected cells (step S40). In some embodiments, the security feature may be a string of numbers (that is, a special code) or an image feature (Memory FingerPrint) from the selected cells. In an embodiment, the selected cells may be cells in a given area of the predetermined memory block, that is, the quantity of the selected cells is less than the quantity of total cells of the predetermined memory block, and the selected cells are neighboring to each other in positions of the pre-determined memory block to form a two-dimensional array.

In another embodiment, the selected cells may be given cells of the predetermined memory block. For example, the quantity of the selected cells is less than the total quantity of the cells of the pre-determined memory block, and the selected cells are neighboring to each other in orders of the predetermined memory block and are at intervals with a given quantity (a positive integer greater than 1, such as 4 or 10). The given quantity of the intervals between the neighboring cells of the selected cells may be the same or different. Further, the quantity of the selected cells is less than the total quantity of the cells of the predetermined memory block and the current threshold voltage (Vt) of the selected cells is within a voltage range.

Figure 4:
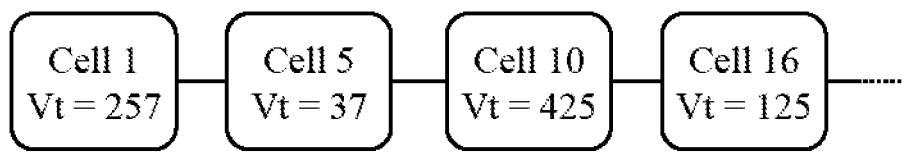
FIG. 4 is a schematic diagram of a security feature of an instance.

In an embodiment, in step 30, the data read-write circuit 110 selects from the predetermined memory block according to a predetermined sampling algorithm to obtain a plurality of selected cells in the predetermined memory block (step S30), sorts the plurality of selected cells to form a series of selected cells, and uses current threshold voltage (Vt) of the sorted cells as a code (Memory Vt Level Key) (as shown in FIG. 4) (step S40). The unit of the threshold voltage Vt in FIG. 4 is a unit voltage. For example, the special code may be a string of numbers formed by threshold voltage Vt of a plurality of selected cells falling within a voltage range in a given area, or the special code may be positions (an order number in the predetermined memory block) of a plurality of selected cells falling within a given voltage range in a given area, or the special code may be a string of numbers that are at intervals in order in a given area and that are formed by threshold voltage (Vt) of a plurality of selected cells with a given quantity. In another embodiment, the data read-write circuit 110 may further transform the obtained special code into an image feature (step S40). For example, the special code may be a pattern formed by a connection of a plurality of selected cells falling within a given voltage range in a given area.

In another embodiment, the data read-write circuit 110 selects from the predetermined memory block according to a predetermined sampling algorithm to obtain a plurality of selected cells in a given area of the predetermined memory block, wherein the predetermined sampling algorithm includes a given area and a given voltage range (step S30), and then forms an image feature by using the plurality of selected cells obtained through connection (step S40).

In still another embodiment, the data read-write circuit 110 selects from the predetermined memory block according to a predetermined sampling algorithm to obtain a plurality of selected cells in the predetermined memory block (step S30), and then uses threshold voltage (Vt) of the plurality of selected cells of the predetermined memory block as an image feature (step S40).

After establishing the security feature (step S40), the data read-write circuit 110 stores the security feature to the storage unit 130, and uses the security feature as a pre-stored security feature used in a confirmation program executed subsequently before each access operation.

Figure 5:
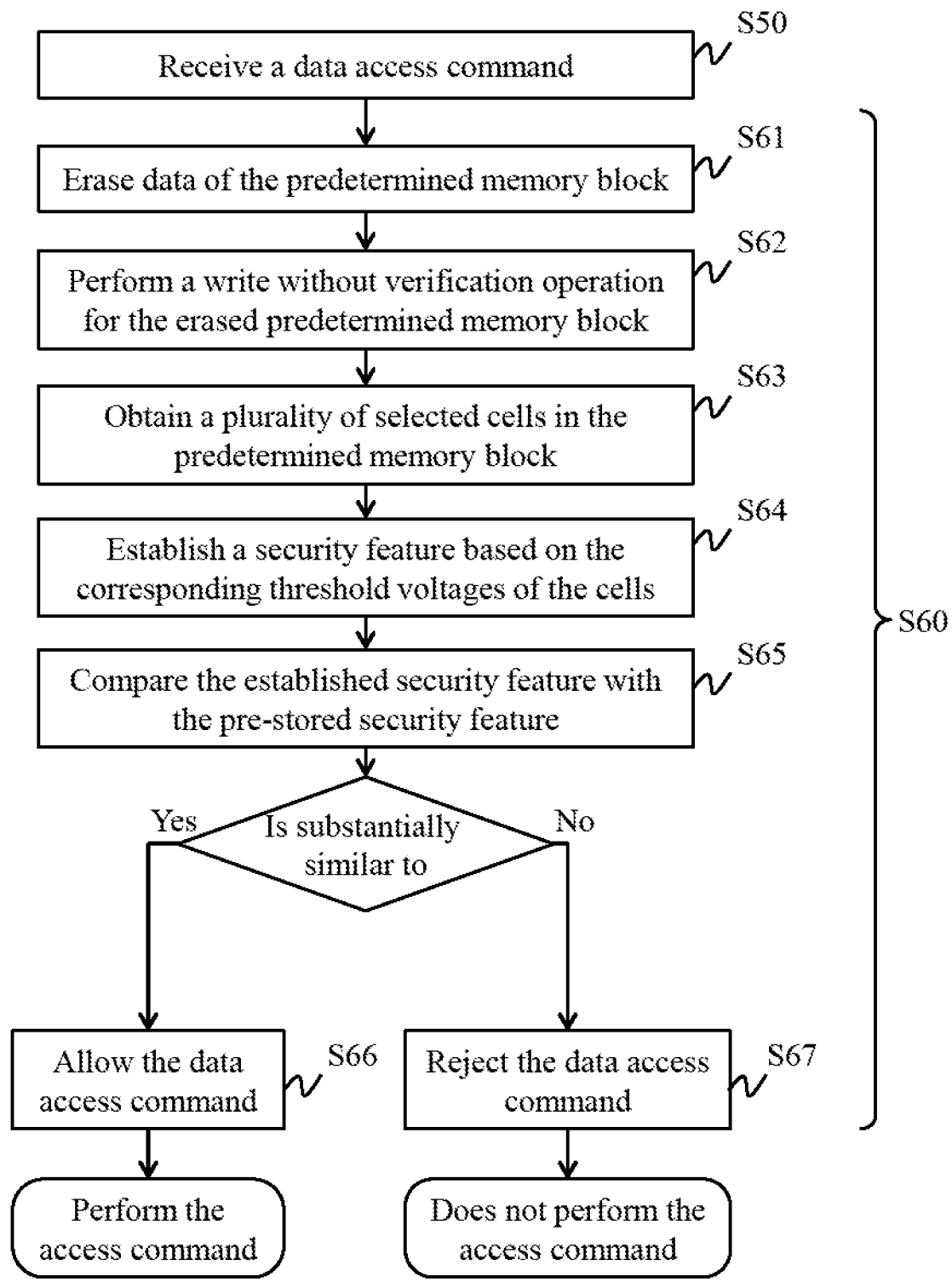
FIG. 5 is a flowchart of a control method of a flash memory according to an embodiment of the present invention.

In some embodiments, referring to FIG. 1 and FIG. 5, the data read-write circuit 110 receives a data access command sent by the external device 30 (step S50). When receiving the data access command (step S50), the data read-write circuit 110 first executes a security confirmation program (step S60), to confirm whether to allow the data access command from the external device. In the security confirmation program (step S60), the data read-write circuit 110 generates a security feature (that is, steps S61 to S64) in a generation manner roughly the same as the previous manner of generating the pre-stored security feature (that is, steps S10 to S40). The number of the erasing step (step S61) in the security confirmation program may be the same as the number of the erasing step (step S10) in the process of generating pre-stored security feature. For example, the erasing step is performed only once in both step S61 and step S10, or step S61 and step S10 separately include the step of erasing for the first time (step S12), the step of writing (step S14), and the step of erasing again (step S14). In addition, the number of the erasing step in the security confirmation program (step S61) may be different from the number of the erasing data step (step S10) in the process of generating pre-stored security feature. For example, erasing is performed only once in step S61, and step S10 includes the step of first erasing data (step S12), the step of writing (step S14), and the step of second erasing data (step S16).

After establishing the security feature (step S64), the data read-write circuit 110 compares the established security feature with the pre-stored security feature (step S65). When the established security feature is substantially similar to the pre-stored security feature, the data read-write circuit 110 allows the data access command (step S66). Therefore, the data read-write circuit 110 performs the access command (for example, reading a required data sequence). When the established security feature is not substantially similar to the pre-stored security feature, the data read-write circuit 110 rejects the data access command (step S67). Therefore, the data read-write circuit 110 does not read the required data sequence.

In an embodiment, each time the access operation is completed, the data read-write circuit 110 can update the security feature stored in the storage unit 130. For example, the security feature stored in the storage unit 130 is updated by using the security feature generated for this access operation.

In another embodiment, the data read-write circuit 110 can regularly update the security feature stored in the storage unit 130 (that is, perform steps S10 to S40 again).

In another embodiment, when the memory control device 10 determines that the current predetermined memory block is not good, the memory control device 10 will update the good block list, and selects at least one good one as a new predetermined memory block according to the updated good block list.

In some embodiments, the flash memory 20 may be a NAND gate flash memory (NAND Flash). The storage unit 130 may be a NOR gate flash memory (NOR Flash).

In conclusion, according to the memory control device, the control method of a flash memory, and the method for generating a security feature of the present invention, an exclusive security feature is generated by using characteristics of the flash memory and is used as a data protection key, to ensure the data security.

What is claimed is:

1. A method for generating a security feature of a flash memory, comprising:
    determining, from a plurality of memory blocks in the flash memory, a memory block having excellent characteristics that can be operated normally;
    erasing data of the determined memory block of the flash memory;
    performing a write operation by providing a predetermined voltage, having a value lower than a highest value a normal write voltage range, to the determined memory block to obtain a threshold voltage of each of a plurality of cells in the determined memory block, wherein a value of each threshold voltage corresponds to a characteristic of each cell in the determined memory block;
    selecting a plurality of cells in the determined memory block; and
    establishing a security feature based on the plurality of corresponding threshold voltages of the cells.

2. The method according to claim 1, wherein the step of erasing data of the determined memory block comprises:
    erasing data in the determined memory block of the flash memory;
    writing predetermined data to the determined memory block; and
    erasing the predetermined data in the written memory block.

3. The method according to 2, wherein the predetermined data is zero.

4. The method according to 1, wherein the write operation is performed without verification.

5. The method according to 1, wherein the security feature is established according to at least one of: the plurality of corresponding threshold voltages of the plurality of cells, and positions of the plurality of cells in the determined memory block.

6. The method according to 1 wherein the predetermined voltage is lower than 22 volts.

7. The method according to 1, wherein the determined memory block is selected from the plurality of memory blocks according to a block list, the method further comprises:
    updating the block list when the determined memory block is not good; and
    determining a new memory block from the plurality of memory blocks according to the block list.

8. A memory control device, applicable to an access operation for controlling a flash memory, wherein the flash memory comprises a plurality of memory blocks, and the memory control device comprises:
    a storage unit, for storing a pre-stored security feature that is unique to the flash memory, wherein the pre-stored security feature is established by providing a fixed voltage to the plurality of memory cells and obtaining from the plurality of memory cells a plurality of threshold voltages of a corresponding plurality of cells of a memory block in the flash memory, wherein each of the corresponding threshold voltages corresponds to a characteristic of each cell in the plurality of memory blocks, wherein the security feature is a numerical representation of the plurality of threshold voltages of the corresponding plurality of memory cells; and a data read-write circuit, coupled to the storage unit, configured to receive a data access request form a host, and to establish a security feature based on the plurality of cells in the memory block, to compare the established security feature with the pre-stored security feature to generate a comparison result, and to determine whether to allow the data access request according to the comparison result.

9. The memory control device according to claim 8, wherein each of the pre-stored security feature and the established security feature is established according to at least one of: the plurality of corresponding threshold voltages of the plurality of cells, and positions of the plurality of cells in the determined memory block.

10. A control method of a flash memory, comprising:
receiving a data access request form a host;
retrieving a pre-stored security feature that is unique to the flash memory from a storage unit, wherein the pre-stored security feature is established by providing a fixed voltage to the plurality of memory cells and obtaining from the plurality of memory cells a plurality of threshold voltages of a corresponding plurality of cells of a memory block in the flash memory, wherein each of the corresponding threshold voltages corresponds to a characteristic of each cell in the plurality of memory blocks, wherein the security feature is a numerical representation of the plurality of threshold voltages of the corresponding plurality of memory cells;

performing a security confirmation program for the data access request, wherein the security confirmation program comprises:
establishing a security feature based on the plurality of cells in the memory block by:
erasing data of the memory block of the flash memory;
providing a predetermined voltage to the memory block to obtain a plurality of corresponding threshold voltages of a plurality of cells in the memory block, wherein each of the corresponding threshold voltages corresponds to a characteristic of each cell in the memory block; and
establishing the security feature based on the plurality of corresponding threshold voltages; and
comparing the established security feature with the pre-stored security feature to generate a comparison result; and
determining whether to allow the data access request according to the comparison result.

11. The control method according to claim 10, wherein the step of erasing data of the memory block of the flash memory comprises:
erasing data in the memory block of the flash memory;
writing a predetermined data to the memory block; and
erasing the predetermined data in the memory block.

12. The control method according to claim 10, wherein each of the pre-stored security feature and the established security feature is produced according to at least one of at least part of the plurality of corresponding threshold voltages of the plurality of cells in the determined memory block and positions of at least part of the plurality of cells in the determined memory block.

* * * * *